June 30, 1970     E. SLADE     3,517,585
REINFORCED PLASTIC TUBE AND GUN BARREL CONSTRUCTION
INCORPORATING AN IMBEDDED EXPANDABLE
WOVEN SCREEN LINING
Filed March 10, 1966
FIG. 1
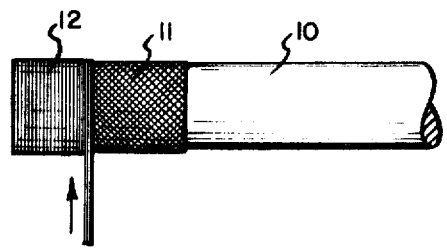
FIG. 2
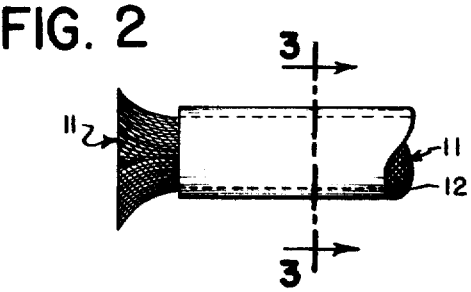
FIG. 3
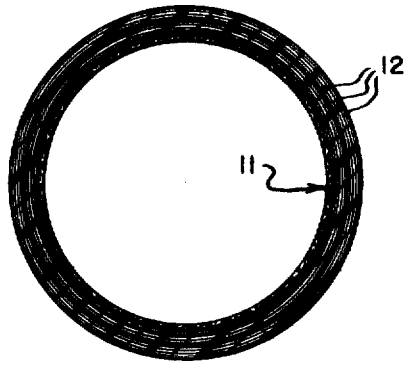
FIG. 4
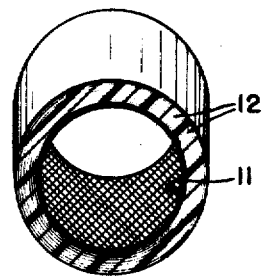
FIG. 5
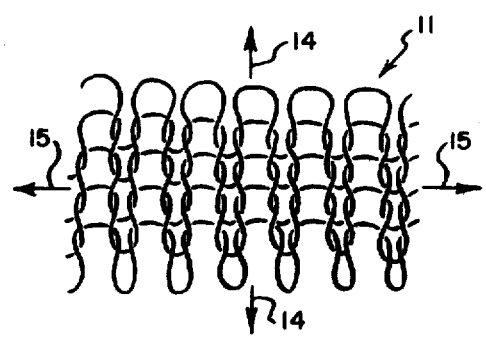
FIG. 7
FIG. 6
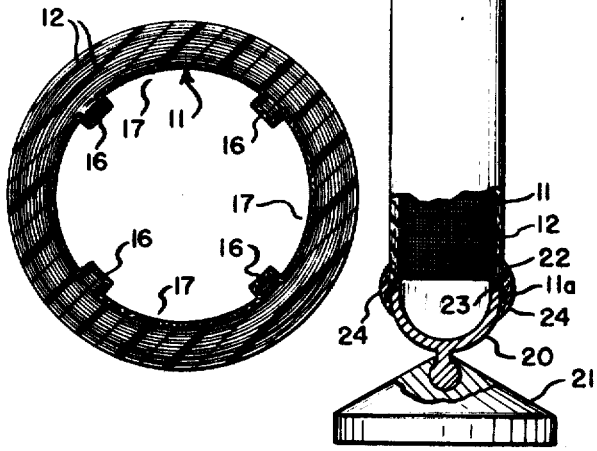
FIG. 8
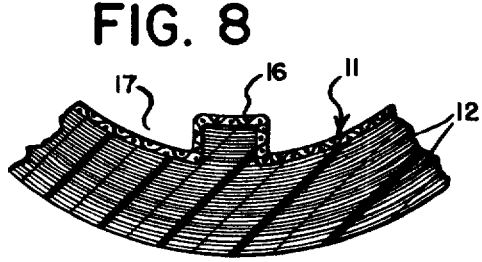
INVENTOR
EDWIN SLADE
BY
ATTORNEYS

United States Patent Office 3,517,585
Patented June 30, 1970

3,517,585
REINFORCED PLASTIC TUBE AND GUN BARREL CONSTRUCTION INCORPORATING AN IMBEDDED EXPANDABLE WOVEN SCREEN LINING
Edwin Slade, 5700 Arlington, Ave., Bronx, N.Y. 10471
Filed Mar. 10, 1966, Ser. No. 533,334
Int. Cl. F41f 17/04, 17/06, 17/08
U.S. Cl. 89—16      11 Claims

ABSTRACT OF THE DISCLOSURE

Hollow cylinders or tubes are prepared from reinforced plastic having an expandable fiber screen lining imbedded in and adhered to the internal surfaces of these hollow cylinders or tubes.

---

This invention relates to reinforced plastic hollow cylinders or tubes which are particularly useful as gun barrels and the like. The invention more particularly relates to a reinforced plastic tube or hollow cylinder having an internal liner embedded in adhered to the internal surface of the reinforced plastic cylinder composed of an expandable interwoven or knittted metallic fiber screen.

It has long been the aim of the military to obtain a light-weight gun barrel having a useful barrel life for greater mobility, and to reduce costs. The use of glass fiber reinforced resins, such as epoxy resins, as a structural element is attractive because of its favorable strength to weight ratio compared to steel. Furthermore, reinforced gun barrels can be produced by gang-windings without extensive machine operations at substantially reduced costs over conventional steel barrels. The major problem of a light-weight reinforced plastic gun barrel is rapid erosion of the inside surface or bore of the barrel due to the combined effects of the projectile and hot gases. Many attempts have been made in the past to insert various liner materials on the inside surface of the reinforced plastic barrel to protect the bore from this high temperature abrasion. These attempts include the insertion of thin metallic cylindrical liners of steel and other metals. This approach was not successful since the metallic liners of sufficient hardness under usual mortar firing conditions have a maximum expansion of about 1–1½%. The fiber glass reinforced plastics have a higher maximum expansion of approximately 3–4%. The firing of a mortar shell through a reinforced plastic gun barrel having a metallic liner adhered to the internal surface thereof causes the plastic to expand beyond the maximum expansion capability of the metal liner and causes the metal liner to buckle, lose adhesion, and thus rendering the barrel useless.

Although the reinforced plastic cylinders having an expandable metallic screen liner adhered to the internal surface thereof are useful in other areas, pipes for conveying abrasive materials for example, the invention will be described in detail with respect to its use as a mortar barrel or tube since this is a most advantageous embodiment.

FIG. 1 shows a portion of a mandrel over which an expandable metallic fiber screen has been placed, and a covering of fiber glass windings impregnated with a resin;

FIG. 2 shows a cylinder having the expandable screen adhered to the internal surface thereof after it has been removed from the mandrel;

FIG. 3 is a cross-section of FIG. 2 taken along the lines 3—3.

FIG. 4 is a perspective view of a portion of a gun barrel showing the expandable screen adhered and embedded in the internal surface thereof;

FIG. 5 shows an expandable screen in the relaxed state which can be used according to the invention;

FIG. 6 shows one manner by which the reinforced plastic barrel can be attached to a conventional mortar breech;

FIG. 7 shows a cross-section of a barrel having rifling therein and an embedded expandable screen; and FIG. 8 is an enlarged cross-section portion of a rifled barrel.

In practicing the invention, a suitable cylindrical mandrel 10 is first obtained having a diameter suitable to produce the internal diameter or bore desired in the final tube or gun barrel. The mandrel can be of any suitable material such as stainless steel. The mandrel is first advantageously treated with a release agent for the particular plastic being employed. Release agents which can be used are well known in the art; examples being, silicone resins, oils, and Teflon.

The expandable metallic fiber screen liner 11 is advantageously knitted or produced in sock or cylindrical form of a suitable diameter to slide over the mandrel 10 in a slightly expanded condition. After the screen has been placed by pulling or rolling it on the mandrel, a layer of the resin is coated over the screen and resin impregnated reinforced fibers, such as glass fibers, are wound over the screen as shown in 12 in the drawings. The fibers are preferably impregnated with the resin before being wound over the screen and mandrel by passing them through a dip tank (not shown) prior to winding contact with the screen and cylinder. Additional resin can be brushed onto the winding after they have been applied if desired.

The resin impregnated fiber glass is shown in FIG. 1 being wound in a circular manner. It is advantageous to wind two layers of the resin impregnated fiber glass over the screen and mandrel in a circular manner as shown and in addition five layers helically at a wind angle of approximately 54° and then a series of five additional circular windings on top of the helical windings. Various winding patterns could, of course, be used in practicing this invention as will be understood by those skilled in the art. In this particular embodiment, it is advantageous to use a combination of circular and helical windings in order to give both longitudinal and hoop strength to the tubes. The helical windings give longitudinal strength and the circular windings give hoop strength to the tube. The ratio of helical to circular windings will depend on the longitudinal and hoop strengths desired. The ratio of circular windings to helical windings given above will produce a tube of hoop to longitudinal strength of about 4:1.

The winding tension is preferably about ½ pound for a 20 end roving glass fiber tape. The tension should be sufficiently low to prevent the resin from being squeezed out from between the fibers as the windings are being made, so that the glass fibers will not touch each other without having resin therebetween. The ultimate ratio of resin to reinforced fibers will depend upon the strength desired in the finished tube and can readily be determined by one skilled in the art. This resin to fiber ratio, the winding patterns, the thickness of the tubes to obtain tubes of various strengths, and various properties as well as the general method of making fiber reinforced plastic tubes, are well-known in the art.

After the windings have been completed, the resin can be cured while the structure is on the mandrel by conventional techniques and removed therefrom. The resin can be only partly cured on the mandrel to give it sufficient strength and the cure completed after it is removed from the mandrel if desired. The internal bores of the tubes are extremely smooth and no machining is required.

One type of expandable metallic liner which can be used in accordance with the invention is illustrated in FIG. 5 which is a section of a tubular screen. The liner is interwoven in an approximate sine curve screen configuration and is expandable in the longitudinal direction indicated by the arrows 14, and in the circumferential direction as indicated by the arrows 15. The liner contemplated by the present invention is expandable in itself in a multiplicity of directions without producing destructive deformation or non-elastic elongation of the fibers themselves used to make the liner. Other configurations of the liner can of course be used and can be in the form of figure 8's or other various link or knitted or woven forms so long as it is expandable within the composite structure to the necessary degree without causing any destructure deformation or non-elastic elongation of fibers themselves of which the liner is composed.

The liner used according to this invention that is placed on the mandrel is preferably knitted in the form of a sock or cylindrical tube so that it is circumferentially smooth and continuous. This avoids the necessity of the longitudinal seams in the finished tube or barrel that might impede the projectile.

With respect to mortar barrels, the expansion of the barrel is mainly in the hoop direction and little or practically no longitudinal expansion occurs. Therefore, longitudinal expansion of the liner is not as important in this embodiment as is circumferential elongation in the hoop direction.

The degree of the bulk expansion of the liner itself can be varied quite widely. It is advantageous to have an expansion of up to 20–30%, which is adequate for most mortar barrel designs. The liner, after it has been embedded in a resin matrix of lesser Young's Modulus than the fiber should be expandable to a point equal to or beyond the ultimate expansion of the composite structure in which it is embedded, or at least the maximum elongation to which the composite structure is subjected during use, without exhibiting failure or separation from the composite structure.

When placing the expandable screen or sock liner on the mandrel, it should fit snugly thereon without any wrinkles, and it is therefore desirable to stretch the screen to a limited extent on the mandrel. Thus the screen or sock in its relaxed state should preferably have an internal diameter slightly less than the diameter of the cylindrical mandrel. For example, a knitted tube sock can be prepared which has a maximum circumferential expansion of 20% and having a diameter so that it will be necessary to stretch the sock approximately 10% by placing it on the mandrel. In this way, a snug fit on the mandrel is obtained and sufficient additional expandability is retained while it is embedded in the composite structure as a liner to prevent damage during the firing of mortar shells.

The screens 11 depicted in FIGS. 1 through 4 and 6 through 8 are schematic and are not intended to illustrate the screen liner form actually used according to this invention for the purpose of convenience. The normal window type screen of orthogonal structure, for example, is not expandable, in this sense, and is generally unsatisfactory as a mortar liner, unless special and restrictive precautions are taken to match the elastic elongation of the liner with the service elongation of the composite hoop. This restriction has the effect, in practice, of eliminating nearly all of the desired candidate liner materials for mortar applications.

The fibers which can be used to make the liners according to this invention can be of any material capable of withstanding the hot abrasion and erosion to which the internal surfaces of the tubes are to be subjected. This invention therefore frees the designer from conventional practice which restricts the choice of liner materials to only those that can match the elongation of the composite structure. In firing of mortars such as 60 mm. the internal pressure rises to 9200 p.s.i. and the internal surface of the barrel generally rises to 400° F. With such mortars it is therefore necessary to use a fiber for the liner which will withstand abrasion and erosion at this temperature, as well as a resin matrix that will retain the liner in place during use. Stainless steel fibers as a liner work well under these conditions. Examples of other fibers which could be used, include metallic fibers of tungsten, titanium, molybdenum, nickel, chromium, iron, vanadium, and so forth, or any alloys thereof. Non-metallic fibers of boron, silica, alumina, graphite silicon nitride, boron nitride, and so forth may also be used; hybrid combinations of metal coated non-metallic fibers, or of non-metallic coated metal fibers may also be used. The particular fiber from which the liner is made will thus depend upon: (a) the degree and type of abrasion to which the internal surface of the tube is to be subjected; (b) the compatibility and adhesiveness of the fiber with the surrounding resin matrix; (c) the cost and availability of the fiber, all of which can readily be determined by those skilled in the art.

The diameter of the fiber or wire used to fabricate the liner can also be varied quite widely. For example, bundles of say 300 fibers as small as 7 microns in diameter can be used to prepare yarn for knit liners. The maximum and minimum size fiber or wire which would be most advantageous could also be determined by those skilled in the art. Wires having a diameter of as large as $9/1000$ inch can be used or even larger if desired. It is advantageous, however, to use the finer fibers in order to achieve compliant knit socks, especially to conform to rifled bores. But heavier wires may be woven to produce a more durable liner.

If desired, radial reinforcements may be incorporated to firmly anchor the liner to the composite structure.

The size of the openings in the knit sock or woven screen can also be varied quite widely. Knit socks having openings of approximately 200 per inch can be used as well as screens having as few as 6 or 7 openings to the inch. The particular size screen opening is not critical, but sufficient fibers should be present in the liner to give to the internal surface of the tubes sufficient abrasion resistance for the intended purpose.

The reinforcement for the plastic or resin used to form the tube and into which the expandable screen liner is inserted is preferably a high temperature resistant fiberglass such as Owens Corning 5994. Other materials can also be used to effect the reinforcement of the plastic as will be apparent by those skilled in the art. Fiber reinforcement is particularly advantageous. Examples of other fibers which can be used include, boron fibers, carbon fibers, and so forth.

Various plastics organic or inorganic can be used to form the tubes or hollow cylinders according to this invention. The particular plastic used will depend mainly upon the operating temperature and erosion resistance desired for the ultimate use and can be determined quite readily by those skilled in the art.

The plastics or resins which can be used are thus well-known in the art. For mortar tubes and barrels, it is advantageous to use a plastic or resin having heat resistance and sufficient tensile and shear strength above 400° F. Examples of such resins are: epoxy resins, polyester resins, silicone resins, polyimide resins, polyamide resins, diphenyl oxide polymers or polyphenylene oxide resins, aluminum phosphate, and so forth.

The barrels made according to this invention can be attached to conventional mortar breeches in various manners. FIG. 6 shows a completed structure having a plastic mortar barrel attached to a conventional mortar breech 20, supported by the base plate 21.

The screen extending from the end of the tube in FIG. 2 is not cut off according to this method of attachment. In FIG. 6, the screen 11 is shown embedded in the internal surface of the plastic tube and having extension 11a, and extending between the end of the barrel and the top end of the breech. The end of the barrel to be attached to the breech is recessed as shown in 22 and the end of the breech is also recessed as shown at 23 to insure a tight and adequate fit between the breech and barrel.

After the barrel and breech have been thus joined, plastic impregnated fiber glass is wound around the external surface of the breech and barrel preferably in a helical wrap configuration as shown in 24 in FIG. 6.

Various plastics can be used to permanently attach the barrel to the breech such as those discussed above with respect to the formation of the barrel. The type of plastic used will depend upon the properties desired such as resistance to heat and abrasion, and sufficient tensile and shear strength at operating temperature and pressure. The thickness of the windings to attach the barrel to the breech can be varied quite widely as will be appreciated by those skilled in the art, and will depend somewhat upon the particular resin used and the degree of strength necessary and required at the joint.

It may also be desired to incorporate the breech as one end of a removable mandrel, with the mortar tube fabricated and filament wound directly over the breach interface.

EXAMPLES

A steel cylindrical mandrel slightly over four feet in length and having a diameter of 60 mm. and a finely ground surface is thoroughly cleaned, and a silicon release agent is applied thereto.

An expandable metallic (stainless steel, 304 alloy) fiber screen having about 200 openings per inch in the form of a knitted sock having an expansion in a multiplicity of directions both longitudinally and radially and a diameter of less than 60 mm. is rolled carefully on the mandrel. The sock knitted with fibers is composed of bundles of about 300 individual 7.5 micron stainless steel fibers twisted together at about five turns to the inch. The metallic fiber screen cylinder or sock is expanded approximately 10% by placing it on the mandrel and snugly fitted thereon. A conventional epoxy resin with curing agents is brushed onto the screen and mandrel.

A 20 end roving fiber glass tape is then impregnated with the same epoxy resin and curing agent and wound in a circular direction on top of the screen and mandrel. Two layers of the resin impregnated fiber glass tape are placed thereon in a circular direction as shown in FIG. 1.

Five layers of the epoxy resins impregnated fiber-glass roving are then placed over the circular windings in helical form at an angle of approximately 54°.

Five additional circular windings of the epoxy impregnated fiber glass roving are then placed on top of five helical winds.

The resin is then cured for two hours at a temperature of 85° C. and then four hours at 150° C. The tube is then removed from the mandrel. The mandrel surface has the appearance of that shown in FIG. 4 and a very thin layer of plastic covering the expandable screen embedded therein. The internal surface is very smooth and requires no machining.

The tube was then subjected to internal pressures of 9250 p.s.i. at room temperature within 1/1000 of a second. This test was repeated ten times. No failure, loss of adhesion, or other damage occurred in the tube as a result of these tests. The tube itself increased 2.8% in circumference under the load and the glass fiber reinforced epoxy resin taken to 84% of its maximum strength. Since the stainless steel used to make up the screen would break under an expansion of 1.53%, it can readily be seen that a tube or mortar barrel is produced having the properties of a stainless steel liner but which is capable of expansion considerably above and beyond the maximum elongation of stainless steel. The abrasion resistant quality of the surface was tested at 425° F. and found to be satisfactory. The weight of the barrel with the liner was 559 gms. per lineal foot.

The embodiment discussed above and in the example produces a smooth internal surface or bore. Smooth surfaces are conventionally used in the 60 and 80 mm. mortars. The 90, 105, 107, and 155 mm. mortars are conventionally rifled. These mortar barrels thus contain lands and grooves to produce the rifling. The depth and size of the grooves and lands are conventional and well-known in the art.

This invention also includes a rifled mortar tube or barrel made of fiber reinforced plastics and having expandable fiber screen liners embedded in and adhere to the internal surface of the rifled barrel and in which the internal screen liner is conformed to the rifling or lands and grooves.

Such a rifled mortar barrel could be produced by forming a mandrel having the desired reverse rifling configuration therein, placing the expandable screen on the mandrel as described above and physically conforming the screen to the grooves on the mandrel. Such a process, however, will tend to deform the fibers of which the screen is made.

This invention, therefore, includes the use of an expandable preformed metal screen or liner knitted or otherwise constructed to the configuration of the grooves or reversed rifled mandrel mold. In this way the screen fits the grooves in the mandrel without the necessity of deforming the metal fibers making up the expandable screen.

FIG. 7 is a cross-section of a rifled barrel showing the expandable screen conforming to the lands and grooves therein. The preformed screen will therefore have an identical configuration shown in FIG. 7 prior to insertion of it on the grooved mandrel. The lands are indicated at 16 and the grooves at 17.

The tubes or hollow cylinders having the expandable fiber screen liners embedded in the internal surface thereof are particularly useful for low pressure applications due to the inherent inability of the plastics available today to withstand service pressures.

The mortar tubes of this invention are particularly applicable to low temperature, low rate of fire mortars in which the barrel temperature does not exceed the temperature limitation of the plastic used to make the barrel for any significant length of time.

The discovery of additional plastic materials and/or fibers which can withstand higher pressures and higher temperatures of course would extend the area of use of the tubes or mortar barrels of this invention.

It is claimed:

1. A hollow cylinder or tube composed of reinforced plastic having an expandable fiber screen liner embedded in and adhered to the internal surface of the hollow cylinder.

2. The cylinder of claim 1 in which the fiber is metallic.

3. The hollow cylinder of claim 1 in which the screen liner is in the form of a hollow cylinder and circumferentially continuous.

4. The hollow cylinder of claim 3 in which the plastic is reinforced with fiber.

5. The hollow cylinder of claim 4 in which the reinforcing fiber is fiber glass.

6. A mortar tube or barrel comprising a fiber reinforced plastic tube having an expandable fiber screen liner embedded in and adhered to the internal surface of the tube.

7. The mortar tube of claim 6 in which the screen fibers are metallic.

8. The mortar tube of claim 7 in which the metallic fiber screen is made of stainless steel.

9. A rifled gun barrel or mortar tube having grooves and lands comprising a fiber reinforced plastic tube having an expandable fiber screen liner embedded in and adhered to the internal surface of the tube and conforming to said lands and grooves.

10. The rifled gun barrel of claim 9 in which the fiber reinforcement is fiber glass and the screen fiber is metallic.

11. A tubular ballistic structure comprising: a tubular arrangement of abrasion and heat resistant metal fibers; a structural shell outwardly backing said layer of metal fibers; and an adherent plastic matrix bonding said fibers to said shell, said metal fibers and matrix defining an exposed inner surface of said surface.

References Cited

UNITED STATES PATENTS

| | | | |
|---|---|---|---|
| 2,404,904 | 7/1946 | Collins | 42—76.1 |
| 2,845,741 | 5/1958 | Day | 42—76.1 |
| 2,847,786 | 8/1958 | Hartley et al. | 42—76 |
| 3,263,613 | 8/1966 | Rice et al. | 60—35.6 |
| 3,298,279 | 1/1967 | Barnet et al. | 42—76.1 |

BENJAMIN A. BORCHELT, Primary Examiner

T. H. WEBB, Assistant Examiner

U.S. Cl. X.R.

42—76